(12) United States Patent
Volum (10) Patent No.: US 7,404,686 B2
(45) Date of Patent: Jul. 29, 2008

(54) SNAP FITTING FOR JOINING COMPONENT PARTS OF AN ARTICLE OF ASSEMBLY

(76) Inventor: Peter Volum, 12395 SW. 130th St., Suite 106, Miami, FL (US) 33186

( * ) Notice: Subject to any disclaimer, the term of this patent is extended or adjusted under 35 U.S.C. 154(b) by 307 days.

(21) Appl. No.: 11/115,811

(22) Filed: Apr. 26, 2005

(65) Prior Publication Data

US 2006/0237967 A1    Oct. 26, 2006

(51) Int. Cl.
*F16B 7/10* (2006.01)
(52) U.S. Cl. .................. 403/109.8; 403/316; 403/377; 403/379.6; 285/370; 285/397
(58) Field of Classification Search ............... 403/290, 403/316, 317, 341, 326, 109.2, 109.3, 109.5, 403/109.6, 109.8, 377, 378, 379.4, 379.6; 285/7, 921, 319, 286, 323, 423, 370, 397
See application file for complete search history.

(56) References Cited

U.S. PATENT DOCUMENTS

| | | | | |
|---|---|---|---|---|
| 3,743,326 A | * | 7/1973 | Courtot et al. | 285/105 |
| 4,663,819 A | * | 5/1987 | Traylor | 29/432 |
| 4,694,544 A | * | 9/1987 | Chapman | 24/625 |
| 4,758,023 A | * | 7/1988 | Vermillion | 285/7 |
| 4,887,849 A | * | 12/1989 | Briet | 285/91 |
| 4,896,991 A | * | 1/1990 | Yashuhara | 403/290 |
| 4,927,287 A | * | 5/1990 | Ohkawa et al. | 403/408.1 |
| 4,949,745 A | * | 8/1990 | McKeon | 137/15.09 |
| 5,379,496 A | * | 1/1995 | Krauss | 24/625 |
| 5,492,311 A | * | 2/1996 | Kurr et al. | 267/140.13 |
| 6,523,864 B1 | * | 2/2003 | Discher et al. | 285/319 |
| 6,695,365 B2 | * | 2/2004 | Chong et al. | 292/348 |
| 6,764,103 B1 | * | 7/2004 | Moretz | 285/81 |
| 6,942,485 B1 | * | 9/2005 | Richard | 433/118 |
| 6,971,684 B2 | * | 12/2005 | Ferrari | 285/319 |
| 7,004,671 B2 | * | 2/2006 | Tawara et al. | 403/341 |

FOREIGN PATENT DOCUMENTS

JP    406213285 A  *  8/1994

* cited by examiner

*Primary Examiner*—Daniel P. Stodola
*Assistant Examiner*—Nahid Amiri
(74) *Attorney, Agent, or Firm*—Robert M. Downey, PA

(57) ABSTRACT

A snap-fit arrangement for joining component parts, such as tubular sections and fittings includes a male coupling and a female coupling. A portion of the male coupling extends from one component part and includes cantilever prongs with enlarged heads. The exposed portion of the male coupling and prong heads are structured and disposed for insertion into another component part and through the female coupling until the prong heads exit the inner end of the female coupling and snap outwardly into locked engagement, thereby releasably connecting the two component parts.

20 Claims, 8 Drawing Sheets

SNAP FITTING FOR JOINING COMPONENT PARTS OF AN ARTICLE OF ASSEMBLY

BACKGROUND OF THE INVENTION

1. Field of the Invention

The present invention is directed to snap fit attachment structures and, more particularly, to a snap fit arrangement using a male coupling and female coupling with interlocking cantilever prongs for joining component parts in the assembly of an article of manufacture.

2. Discussion of the Related Art

Many products are packaged and shipped by the manufacturer to stores in a collapsed form in order to reduce shipping costs as well as warehouse storage and store shelf space. In many instances, the product remains collapsed in its original packaging until sold to a consumer. In particular, furniture items (e.g. tables, cabinets, bookcases, shelving, shoeracks, etc.) are typically shipped to stores in a box consisting of an array of individual parts packaged neatly in a compact package. Instructions and hardware for assembling the item are typically included in the box. To save shelf space and reduce costs, many stores sell items of this nature to the end consumer in the original manufacturer's box. This also allows the consumer to more easily transport the item in their automobile to their home or other destination where the item will be assembled and used. The cost saved by the manufacture and store by eliminating assembly is typically passed on to the consumer, along with the task of assembling the item. Depending upon the item and the manner of installation, the consumer may need tools, supplies, (e.g. glue, hardware, etc.) and various equipment to complete the assembly. This can make the task more difficult and frustrating, particularly if some or all of the needed tools and supplies are not provided by the manufacturer.

The ability to assemble articles of manufacture without use of tools, hardware, glue, etc. is extremely convenient and particularly attractive to the average consumer who typically possesses minimal skills, patience and the tools needed to assemble an article with the use of hardware such as screws, bolts, nuts, and the like.

Snap-in or snap fit connection of component parts is probably the most common method of easy, do-it-yourself assembly that avoids use of tools, hardware, glue, etc. However, the overall strength of the assembled structure is sometimes compromised when using a snap fit method of connection.

Accordingly, there remains a need for a snap fit arrangement and method for joining two or more components together in the assembly of an article of manufacture which is rigid, strong and avoids the need for special tools and hardware. Moreover, there is a need for a high strength snap fit arrangement which joins tubular sections to various fittings and which can be adapted for use in the assembly of a wide variety of items such as, but not limited to, shelf supports, tables, chairs, cabinets, shoe racks, merchandise stands in stores, sign supports, animal cages, barricades and the like without the need of any tools, hardware, glue or additional supplies.

OBJECTS AND ADVANTAGES OF THE INVENTION

With the foregoing in mind, it is a primary object of the present invention to provide a structural arrangement for joining tubular sections and fittings without the use of tools, hardware or other materials.

It is a further object of the present invention to provide a structural arrangement for joining pipe sections to various fittings without the use of tools, adhesives or other materials.

It is still a further object of the present invention to provide a structural arrangement for snap fit connection of pipe sections and fittings in the assembly of an article, such as a table, shoe rack, shelf support or the like.

It is still a further object of the present invention to provide a structural arrangement for joining pipe sections and fittings without the use of tools or adhesives and, wherein the joined pipe sections and fittings are separable from one another for subsequent collapsing, reassembly or reconfiguration.

It is still a further object of the present invention to provide a structural arrangement for snap fit joining of pipe sections and fittings in the assembly of an article, and wherein the snap fit structural arrangement is adapted for repeated joining and separation of the component pipe sections and fittings.

It is yet a further object of the present invention to provide a snap fit arrangement for joining PVC component parts together in an assembly of an article of manufacture which is rigid, strong and avoids the need for tools, hardware, glue and other material and equipment.

These and other objects and advantages of the present invention are more readily apparent with reference to the following detailed description and accompanying drawings.

SUMMARY OF THE INVENTION

The present invention is directed to a snap-fit structural arrangement for joining tubular sections and fittings in the assembly of an article (e.g. table, shoe rack, shelf support, etc.) includes a male coupling and a mating female coupling. The male coupling includes a first end portion sized for snug fitted frictional receipt within an open port of a fitting and an opposite second end portion of reduced exterior dimension to form a shoulder between the first and second end portions. Two or more prongs are integrally formed with the second end portion and are flexible inwardly towards a hollow axial core. The female coupling is hollow and has a tapered end and an exterior dimension that is sized for snug fitted, frictional receipt within the open end of a pipe section. A flange on the opposite end of the female coupling limits travel through the pipe section and butts against the open end when fully inserted. The second end portion of the male coupling is sized and configured for axial passage through the female coupling until enlarged heads on the prongs exit the tapered inner end of the female coupling. The outer sides of the enlarged heads are tapered to promote insertion and passage of the second end portion of the male coupling through the female coupling, with the prongs being urged inwardly from a relaxed state by the interior wall surface of the female coupling. Upon exiting the inner end of the female coupling, the enlarged prong heads release outwardly to the relaxed state so that an underside of the enlarged head engages the inner end of the female coupling, thereby releasably locking the male coupling to the female coupling. The underside of the enlarged prong heads is angled so that a sufficient outward pulling force on the male coupling will result in inward flexing of the prongs and release of the prong heads from the end of the female coupling, thereby permitting removal of the male coupling.

BRIEF DESCRIPTION OF THE DRAWINGS

For a fuller understanding of the nature of the present invention, reference should be made to the following detailed description taken in conjunction with the accompanying drawings in which.

DETAILED DESCRIPTION OF THE PREFERRED EMBODIMENT

The snap fit assembly of the present invention is shown throughout FIGS. 1-5 and is generally indicated as 10. The snap fit assembly 10 is particularly suited for joining tubular segments or pipe sections (e.g. PVC pipe sections) to either other pipe sections or fittings (e.g. L-shaped, T-shaped, cross shaped, 3-way, 4-way, etc.) for interconnection between pipe sections or as terminal ends of pipe sections (e.g. end caps). The use of fittings is particularly desirable to provide added strength and rigidity to an assembled article, such as a table, shoe rack, shelf support or the like. Use of fittings between the pipe sections further provides for multi-directional attachment of the pipe sections in the assembly of the particular article of manufacture.

In a preferred embodiment, the snap fit assembly 10 includes a male coupling 20 and a female coupling 30. The preferred arrangement is to fit the male coupling 20 within the one or more open ends 24 of a particular fitting, such as the 4-way fitting 22 shown in FIG. 1. The female coupling 30 is preferably fitted within the open ends 34 of tubular pipe sections 32. As described hereinafter, the male and female couplings are cooperatively structured and disposed for snap fit, abutting attachment of the pipe sections 32 to the one or more fittings 22 in the assembly of an article.

The male coupling 20 has a hollow interior 40 between opposite open ends 41, 42. The structure of the male coupling surrounding the hollow interior is formed to include a plug portion 50 and a connector portion 60. The plug portion has a larger outer cross-sectional dimension (e.g. outer diameter) compared to the outer cross-sectional dimension of the connector portion 60, thereby forming a shoulder or abutment surface 52 at the juncture where the outer dimensions of the plug and connector portions abruptly change. The outer dimension of the plug portion is specifically sized for congruent, snug fit within the open end of the fitting 22 or a pipe section section 32 so that an outer surface 54 of the plug portion is disposed in frictional engagement with an inner surface 26 of the fitting or pipe section, thereby providing a press fit without the use of adhesives. It should be noted, however, that use of adhesives is contemplated within the scope of the invention and, may be desirable in some instances. In one preferred embodiment, the male coupling 20 is integrally molded with the fitting 22 as a single piece.

In the example shown in the drawings, one end zone 56 of the plug portion 50 is tapered to promote insertion of the plug portion within the open end of the fitting. When fully inserted in the fitting, the end of the plug portion engages an abutment shoulder 28 within the interior of the fitting, thereby insuring that the shoulder 52 between the plug portion 50 and connector portion 60 is positioned in flush alignment with the open end surface 29 of the fitting 22.

The connector portion 60 is defined by a tubular wall 62 which extends from the shoulder 52 to the distal end 58. The tubular wall has an outer surface 64 and in inner surface 66. A pair of oppositely disposed prong members 70 are integrally formed with the wall of the connector portion between a pair of parallel open ended slots 72 extending longitudinally from the distal end 58 and terminating prior to the shoulder 52. The arrangement of the slots 72 provides an integrated flex joint which permits the prongs 70 to flex inwardly and outwardly relative to the wall structure of the connector portion upon application of an external force to heads 76 of the prongs. The heads 76 are formed with an angled face 77 and catch surface 78 which protrude outwardly beyond the exterior dimensions of the wall structure 62 when the prongs 70 are in a relaxed state.

The female coupling 30 is provided with a hollow interior 80 extending between opposite open ends 84, 86 to define a through passage. A main central portion 82 of the female coupling 30 is sized and configured for congruent, snug fit within the open end 34 of the pipe section 32 so that an outer surface 88 of the female coupling is disposed in frictional engagement with an inner surface 35 of the pipe section. An inner end zone of the female coupling 30 is provided with an exterior tapered dimension 90 to promote insertion of the female coupling within the open end 34 of the pipe section 32 for snug, press fit attachment thereto. In a preferred embodiment, no adhesives are required for attachment of the female coupling 30 to the pipe section 32. It is noted, however, that use of adhesives is contemplated within the scope of the invention and, in some instances, it may be desired to use an adhesive substance to fix the female coupling to a pipe section. In the one preferred embodiment, the female coupling 30 is integrally molded with the pipe section 32 as a single piece.

In the example shown in the drawings, the opposite end of the female coupling is provided with an annular flange 92 surrounding the open end 84. An underside surface 93 of the annular flange buts against the end of the pipe section when the female coupling is fully inserted therein. Accordingly, the annular flange 92 serves as a stop member to limit the distance of insertion of the female coupling 30 within the open end 34 of the pipe section 32.

Figures 1, 2:
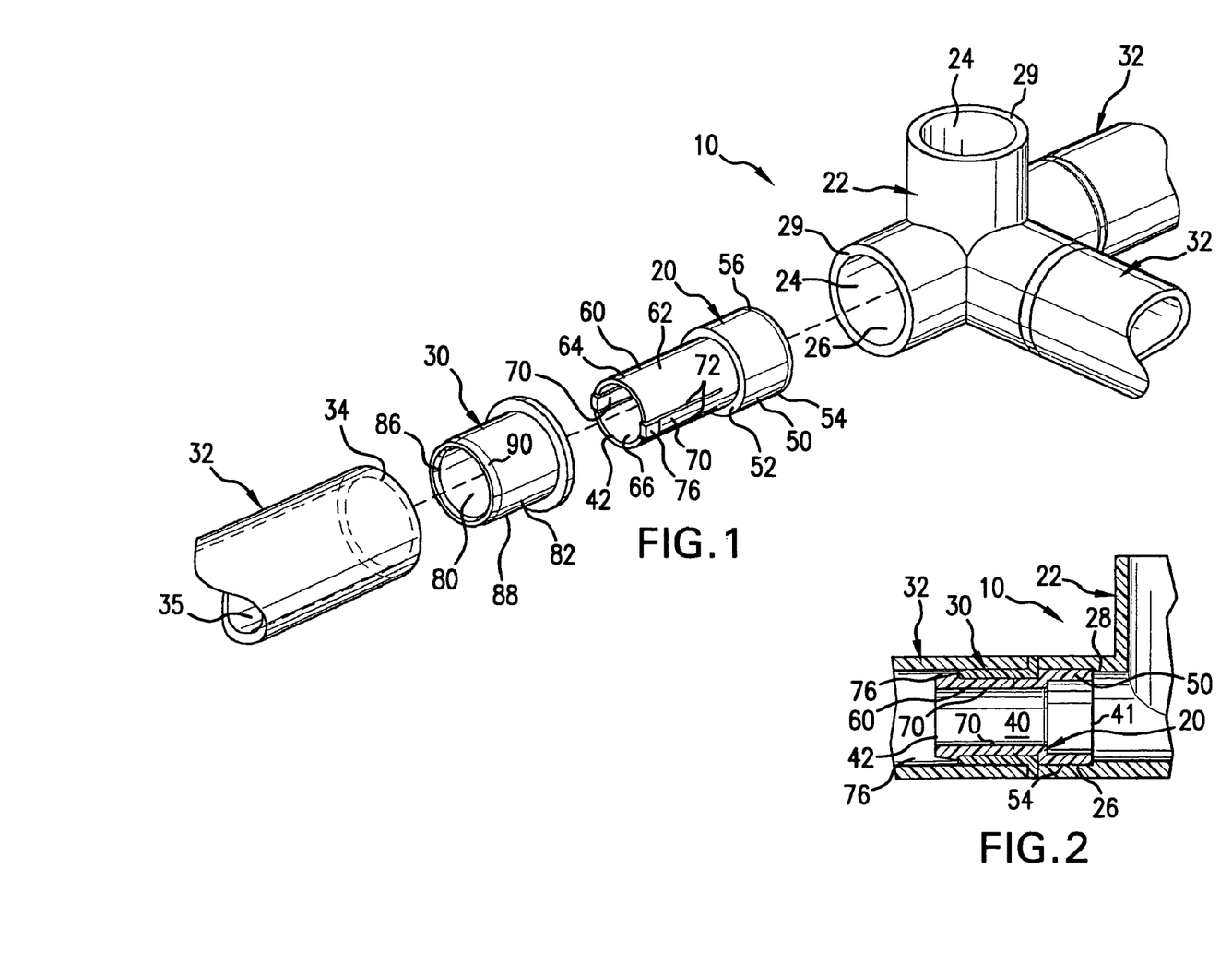
FIG. 1 is an exploded perspective view of the snap fitting of the present invention, including a male coupling and a female coupling shown in relation to a pipe section and a four way fitting.
FIG. 2 is an isolated cross-sectional view showing the male coupling in snap fit attachment to the female coupling and joining the pipe section to the fitting.
Figure 3A:
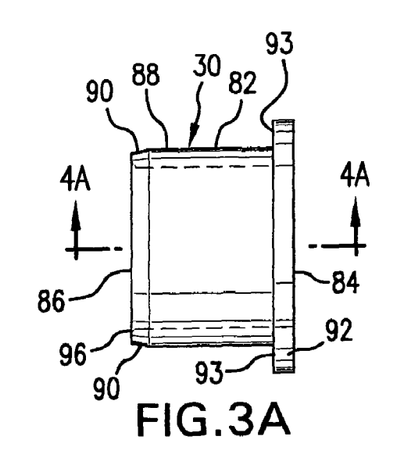
FIG. 3A is a side elevational view of the female coupling of the present invention.
Figure 3B:
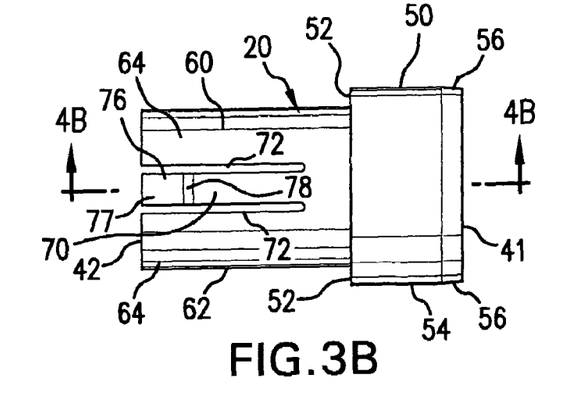
FIG. 3B is a side elevational view of the male coupling of the present invention.
Figure 4A:
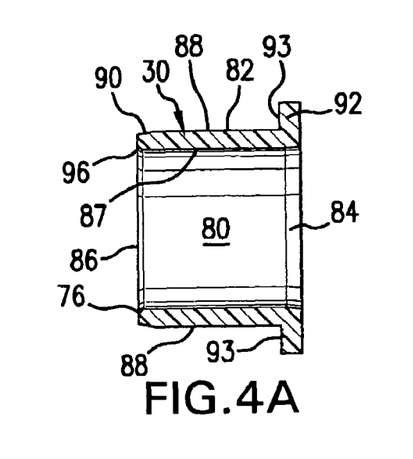
FIG. 4A is a cross-sectional view taken along the line indicated by the arrows 4A-4A in FIG. 3A.
Figure 4B:
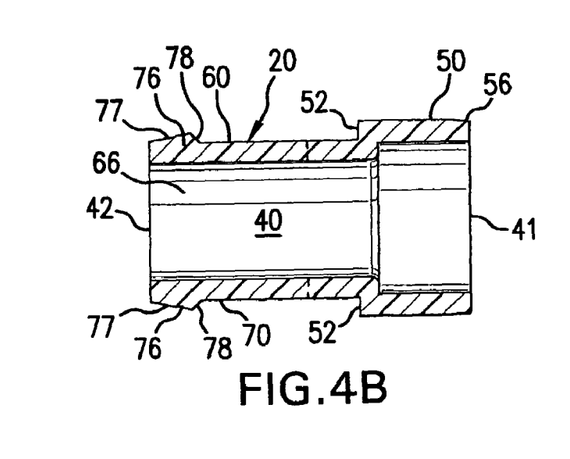
FIG. 4B is a cross-sectional view taken along the plane indicated by the arrows 4B-4B in FIG. 3B.
Figure 5:
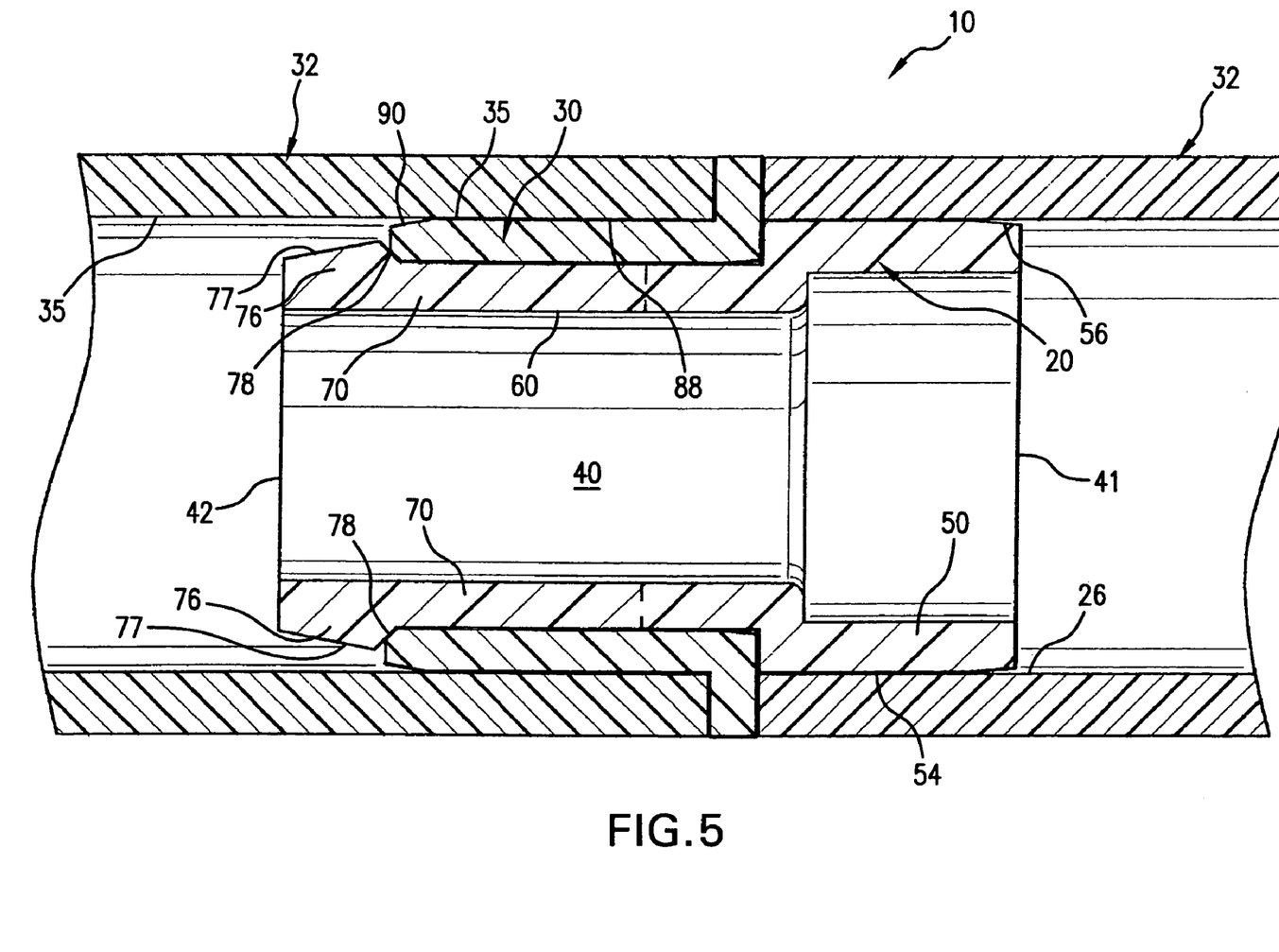
FIG. 5 is an isolated cross-sectional view showing the male coupling in snap fit attachment with the female coupling.
Figure 6:
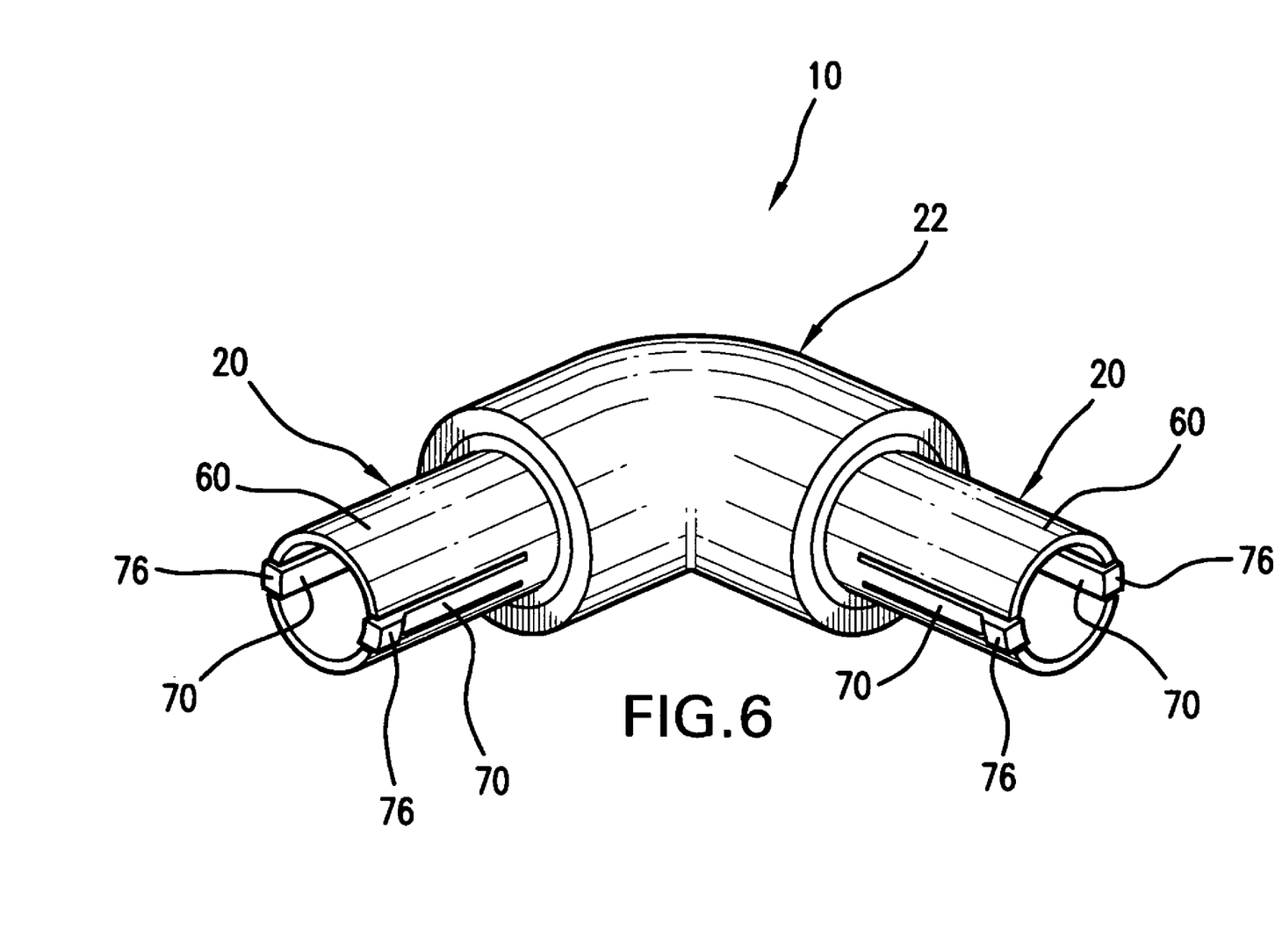
FIG. 6 is a perspective view of an L-shaped fitting with the male couplings fitted within the open ends of the L-shaped fitting.
Figure 7:
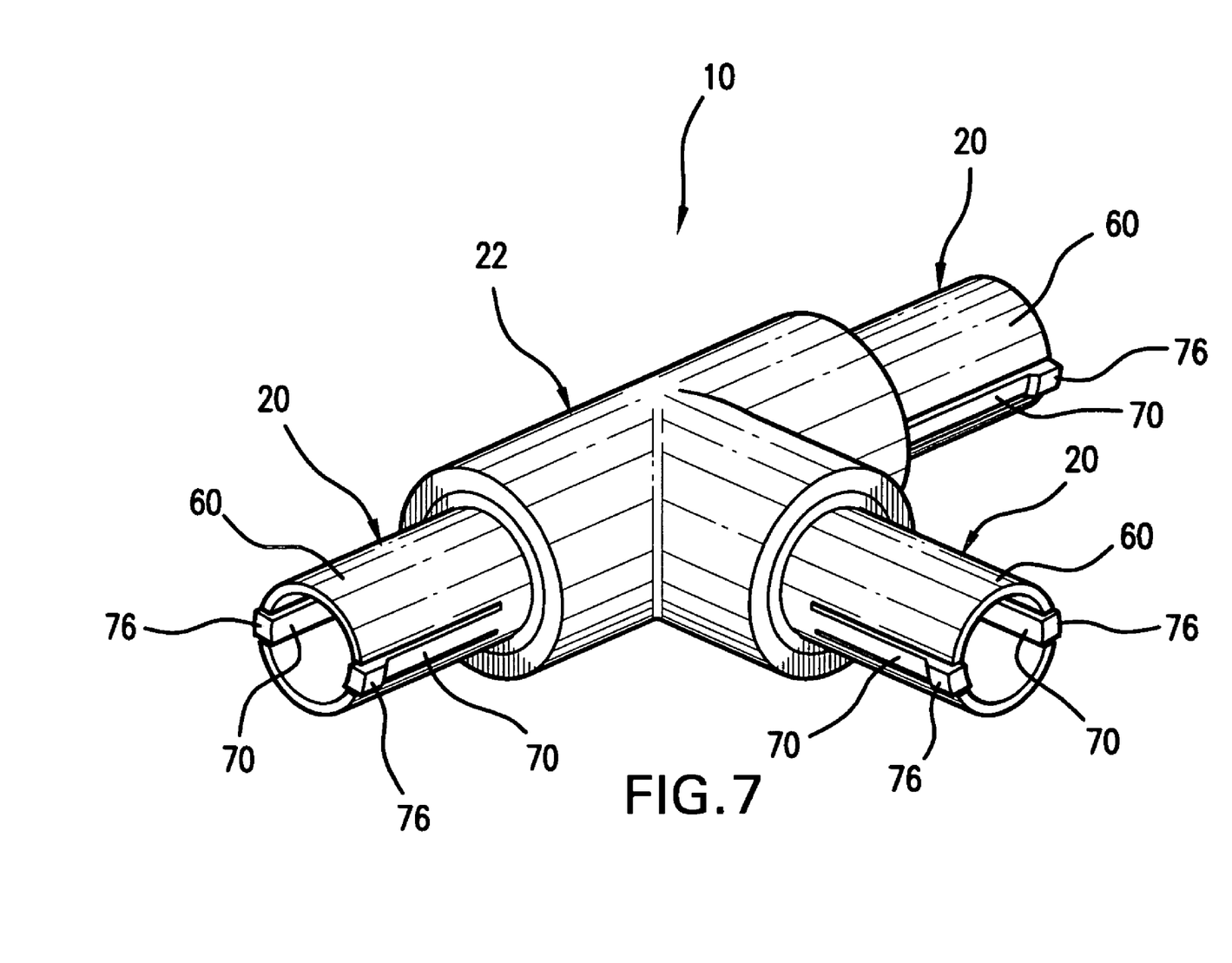
FIG. 7 is a perspective view of a T-shaped fitting shown with the male couplings fitted within the open ends of the T-shaped fitting.
Figure 8:
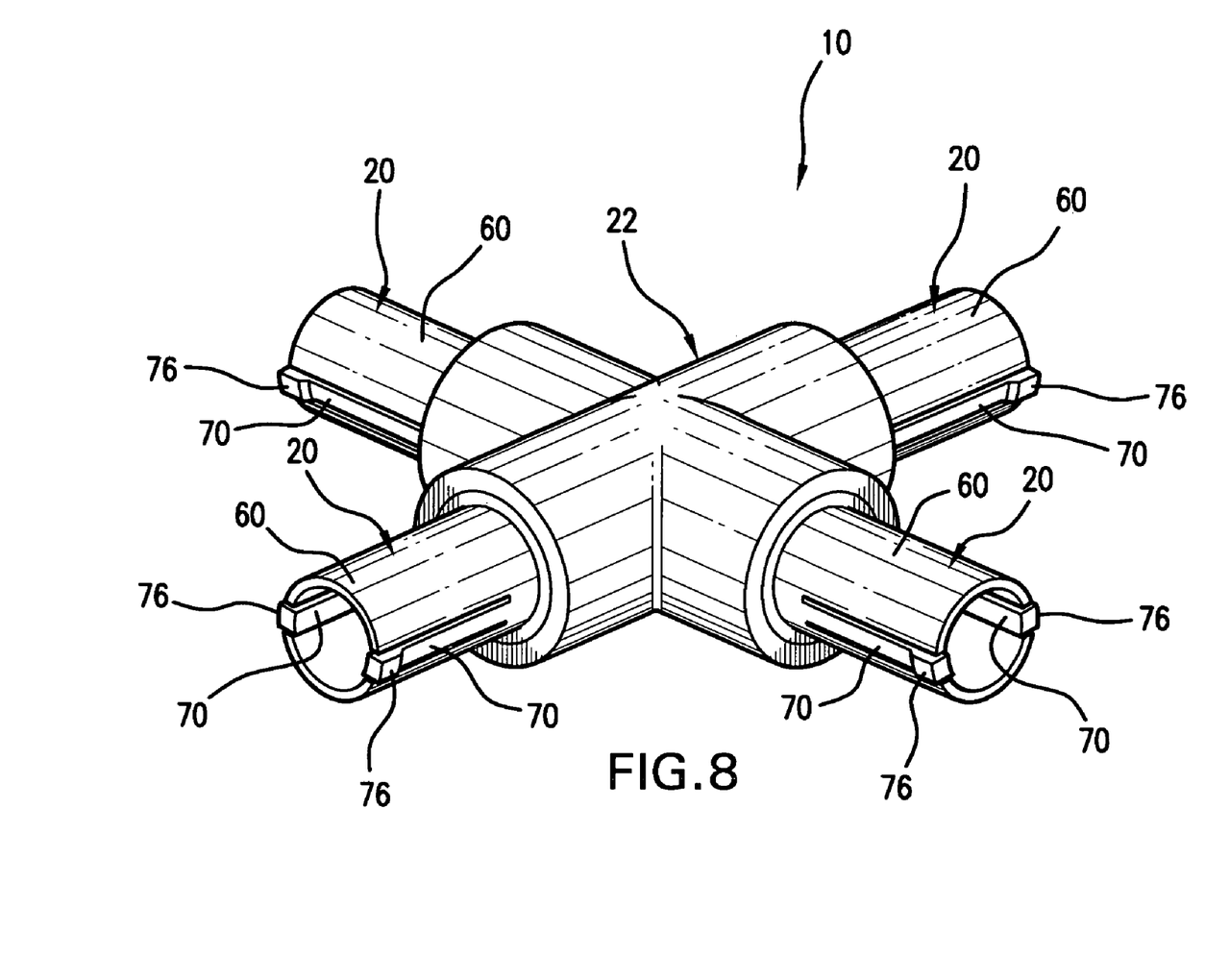
FIG. 8 is a perspective view of a cross shaped fitting shown with the male couplings fitted within the open ends of the cross shared fitting.
Figure 9:
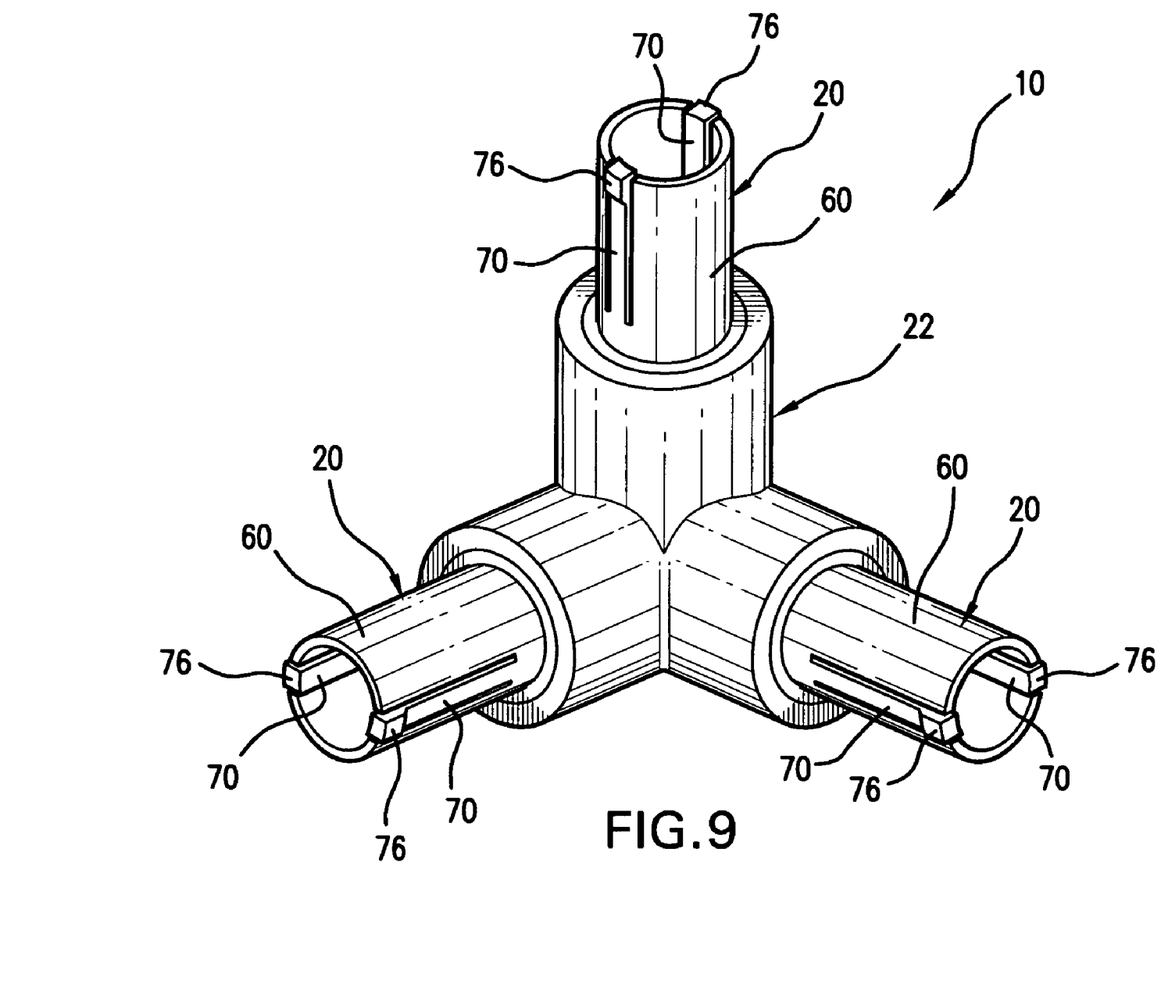
FIG. 9 is a perspective view of a corner fitting shown with the male couplings fitted within the open ends of the corner fitting.
Figure 10:
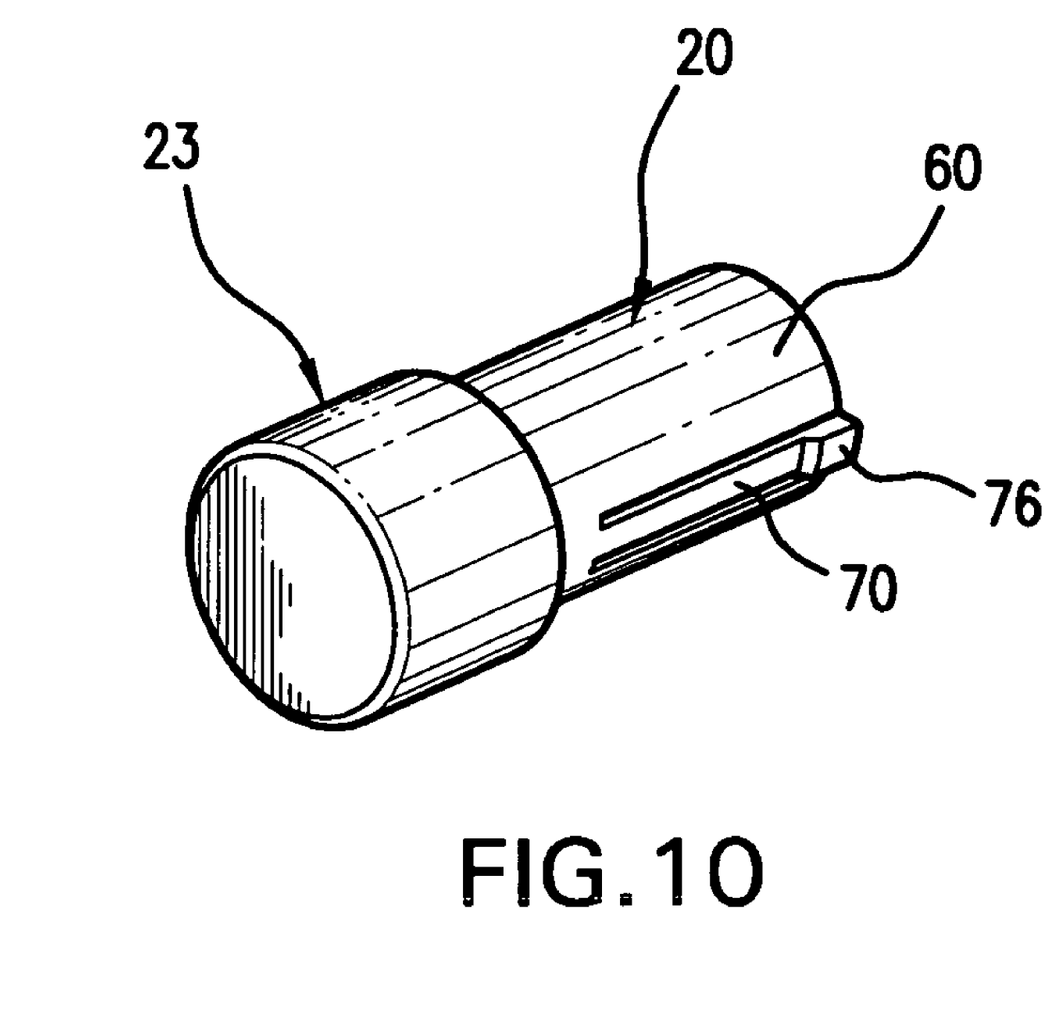
FIG. 10 is a perspective view of an end cap shown with the male coupling fitted thereto.

The through passage formed between the opposite open ends 84, 86 of the female coupling is specifically sized and configured to permit sliding receipt of the connector portion 60 of the male coupling 20 therethrough. The angled face 77 of the heads 76 of the prongs 70 promotes insertion of the prongs and the wall structure 62 of the connector portion through the open end 84 of the female coupling 30. As the connector portion 60 travels through the female coupling, the prong members 70 are urged inwardly from the relaxed position with the angled face 77 of the prong members engaging the interior surface 87 of the female coupling. The distance between the opposite ends 84, 86 of the female coupling is precisely equal to the distance between the shoulder 52 on the male coupling and the juncture between the angled face 77 and catch surface 78 of the prong heads 76. Thus, when the connector portion 60 of the male coupling 20 is fully inserted and received through the female coupling 30, the entire angled outer face 77 of the prong members 70 exits the inner open end 86 of the female coupling, thereby allowing the prong members 70 to return to their relaxed position. As the prong members move outwardly to their relaxed position, the catch surface 78 of each of the prong heads 76 engages a beveled inner surface 96 at the end 86 of the female coupling to thereby lock the male coupling 20 to the female coupling 30. As seen in FIGS. 2 and 5, interlocking of the male and female couplings serves to join the pipe section in flush fitted attachment with the open end of the fitting. The angled arrangement of the catch surface 78 on the prong heads and the beveled inner surface 96 of the female coupling allows for removal and separation of the male coupling from the female coupling upon application of a sufficient outward force which pulls the fitting 22 and pipe sections 32 in opposite directions along their common axis.

While the instant invention has been shown and described in accordance with a preferred and practical embodiment thereof, it is recognized that departures from the instant disclosure are contemplated within the spirit and scope of the present invention.

What is claimed is:

1. An assembly for constructing an article, said assembly comprising:
   a first member having an exterior surface with a cross-sectional dimension, an annular end surface surrounding an open end and a hollow interior with a central axis;
   a female coupling within said first member and said female coupling extending from said open end and into said hollow interior and terminating at a distal end to form an annular shoulder within said hollow interior of said first member, and said female coupling being open on opposite ends and having a hollow core therebetween surrounded by an inner wall surface;
   a second member having an exterior surface with a cross-sectional dimension equal to the cross-sectional dimension of the exterior surface of said first member, and said second member further including an annular end surface and a hollow interior with a central axis;
   a male coupling disposed within and extending outwardly from said second member and including a wall structure surrounding an axial extension of the central axis of said second member, and said wall structure including an exterior surface;
   said male coupling including at least one prong member integrally formed in said wall structure and defined between a pair of spaced, parallel slots formed through an entire thickness of said wall structure, said prong member having an end portion with an angled outer face protruding out-wardly beyond said exterior surface of said wall structure, and said angled outer face extending from a distal end of said prong member to a catch surface to form an enlarged head, and said prong member being structured and disposed for yielding to a force applied to said angled outer face of said enlarged head to allow said enlarged head to move inwardly relative to said wall structure;
   said wall structure of said male coupling being sized and configured for axial passage through the open end of said first member and through said female coupling, with said angled outer face disposed in sliding engagement against said interior wall surface of said female coupling to urge said enlarged head inwardly, and said at least one prong member being structured and disposed to return to a relaxed state upon said enlarged head exiting said distal end of said female coupling so that said catch surface of said enlarged head engages said annular shoulder, thereby releasably locking said male coupling to said female coupling to join said first and second members together with said annular shoulder disposed in abutting engagement with said annular end surfaces of the first and second members, and said exterior surface of said first member flush with said exterior surface of said second member.

2. The assembly as recited in claim 1 wherein said first member is a tubular pipe section.

3. The assembly as recited in claim 2 wherein said second member is a tubular pipe section.

4. The assembly as recited in claim 2 wherein said second member is an L-shaped fitting.

5. The assembly as recited in claim 2 wherein said second member is a T-shaped fitting.

6. The assembly as recited in claim 2 wherein said second member is a cross-shaped fitting.

7. The assembly as recited in claim 2 wherein said second member is a corner fitting.

8. The assembly as recited in claim 2 wherein said second member is a multi-directional fitting.

9. The assembly as recited in claim 2 wherein said second member is an end cap.

10. The assembly as recited in claim 2 wherein said male coupling includes a plurality of said prong members integrally formed in said wall structure, and each of said plurality of said prong members including said enlarged head for engaging said annular shoulder of said female coupling to releasably lock said male coupling to said female coupling, thereby joining said first and second members.

11. An assembly for constructing an article, said assembly comprising:
    a first member having an exterior surface with a cross-sectional dimension, an annular end surface surrounding an open end, and a hollow interior communicating with said open end;
    a female coupling within said first member and said female coupling extending from said open end and into said hollow interior and terminating at a distal end to form an annular shoulder within said hollow interior of said first member, and said female coupling being open at opposite ends and having a hollow core to define a through passage between said opposite ends;
    a second member having an annular exterior surface with a cross-sectional dimension equal to the cross-sectional dimension of the exterior surface of said first member;
    a male coupling disposed within and extending outwardly from said second member and including a wall structure surrounding a hollow interior, with said annular end surfaces of the first and second members, and said wall structure including an exterior surface;
    said male coupling including at least one prong member integrally formed in said wall structure between a pair of spaced, parallel slots formed through an entire thickness of said wall structure, said prong member having an end portion with an angled outer face protruding outwardly beyond said exterior surface of said wall structure, and said angled outer face extending from a distal end of said prong member to a catch surface to form an enlarged head, and said prong member being structured and disposed for yielding to a force applied to said angled outer face of said enlarged head to allow said enlarged head to move inwardly relative to said wall structure;

said wall structure of said male coupling being sized and configured for axial passage through the open end of said first member and through said female coupling, with said angled outer face disposed in sliding engagement with said interior wall surface of said female coupling to urge said enlarged head inwardly, and said at least one prong member being structured and disposed to return to a relaxed state upon said enlarged head exiting said distal end of said female coupling, so that said catch surface of said enlarged head engages said annular shoulder, thereby releasably locking said male coupling to said female coupling to join said first and second members together with said annular shoulder disposed in abutting engagement and said exterior surface of said first member flush with said exterior surface of said second member.

12. The assembly as recited in claim 11 wherein said first member is a tubular pipe section.

13. The assembly as recited in claim 12 wherein said second member is a tubular pipe section.

14. The assembly as recited in claim 12 wherein said second member is an L-shaped fitting.

15. The assembly as recited in claim 12 wherein said second member is a T-shaped fitting.

16. The assembly as recited in claim 12 wherein said second member is a cross-shaped fitting.

17. The assembly as recited in claim 12 wherein said second member is a corner fitting.

18. The assembly as recited in claim 12 wherein said second member is a multi-directional fitting.

19. The assembly as recited in claim 12 wherein said second member is an end cap.

20. The assembly as recited in claim 12 wherein said male coupling includes a plurality of said prong members integrally formed in said wall structure, and each of said plurality of said prong members including said enlarged head for engaging said annular shoulder of said female coupling to releasably lock said male coupling to said female coupling, thereby joining said first and second members.

* * * * *